Figure 1:
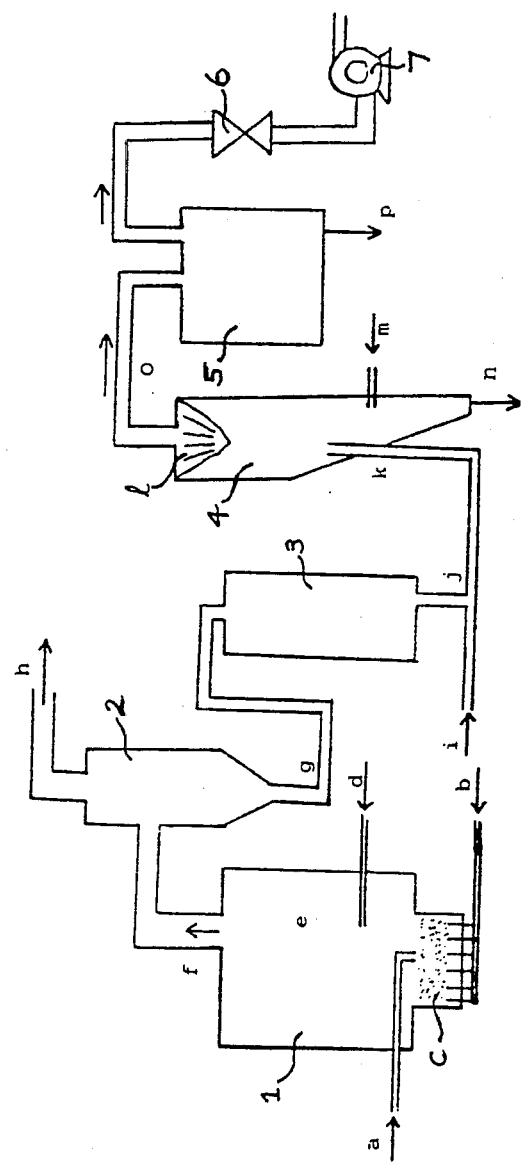

United States Patent [19]

Van Kruining

[11] Patent Number: 4,765,545

[45] Date of Patent: Aug. 23, 1988

[54] RICE HULL ASH FILTER

[75] Inventor: Hendricus A. Van Kruining, Leeton, Australia

[73] Assignee: Ricegrowers' Co-operative Mills, Ltd., Leeton, New South Wales, Australia

[21] Appl. No.: 840,346

[22] Filed: Mar. 17, 1986

[30] Foreign Application Priority Data

Mar. 21, 1985 [AU] Australia .................. PG9846

[51] Int. Cl.[4] .......................................... B02C 19/12
[52] U.S. Cl. ................................... 241/5; 110/346;
  209/11; 241/19; 241/23; 241/24
[58] Field of Search .............. 209/11; 110/222, 346,
  110/245, 347; 241/23, 24, 19, 5, 65, 39, 79.1

[56] References Cited

U.S. PATENT DOCUMENTS

| | | |
|---|---|---|
| 2,315,410 | 3/1943 | Simons et al. .................. 241/23 X |
| 3,814,240 | 6/1974 | Laundrie ......................... 241/23 X |
| 3,847,094 | 11/1974 | Taeymans et al. ........... 110/245 X |
| 4,217,834 | 8/1980 | Pearce ............................ 110/245 X |
| 4,589,355 | 5/1986 | Chastain et al. .............. 110/245 X |
| 4,602,743 | 7/1986 | Nied ................................ 241/39 X |

FOREIGN PATENT DOCUMENTS

| | | |
|---|---|---|
| 1239548 | 4/1967 | Fed. Rep. of Germany ........ 241/19 |
| 1449718 | 9/1976 | United Kingdom . |
| 2007812 | 5/1979 | United Kingdom . |
| 1604221 | 12/1981 | United Kingdom . |
| 2083184 | 3/1982 | United Kingdom ................ 110/245 |
| 578524 | 10/1977 | U.S.S.R. .............................. 110/245 |

Primary Examiner—Mark Rosenbaum
Attorney, Agent, or Firm—Townsend & Townsend

[57] ABSTRACT

A rice-hull-ash filter aid is produced by burning rice hulls to produce ash, grinding the ash to reduce its particle size, classifying the ground ash to remove oversized particles and collecting the remaining particles.

3 Claims, 1 Drawing Sheet

RICE HULL ASH FILTER

TECHNICAL FIELD

This invention relates to a rice hull ash filter aid and a method of making same.

BACKGROUND ART

Filtration of solutions containing gelatinous solids is extremely difficult and slow through normal filter cloths and generally blinding of the cloth occurs with consequent cessation of flow through the filter.

Normal procedure for the improvement in filtration rate involves the use of a filter aid which protects the filter cloth and retains an open structure allowing sufficient flow of filtrate and also clarification of the suspended solids by entrapment in the porous cake.

Diatomaceous earth is used worldwide as a filter aid and consists of the skeletal remains of aquatic plants which are mined in several centers around the world.

Australia has several diatomaceous earth deposits, none of which is entirely suitable as a filter aid because of contamination by clay, sand and iron salts. As a result all filter aid grade diatomaceous earth (DE) used within Australia is imported, mostly from the USA. This involves a large freight cost, particularly because of the low bulk density of the DE, and the necessity to keep large stocks to overcome delivery delays.

Rice hulls are produced as a by-product of the rice milling process in the separation from the rice grain. The hulls are suitable for use as a fuel with an energy level equivalent to that of brown coal. On combustion the hulls generate an ash product which is extremely pure in $SiO_2$, even more so than DE, low in carbon (approximately 2%) and very porous, indicating it may be suitable as a DE equivalent.

DE is processed by calcining in the presence of fluxing agents and then classified to obtain a range of products with a range of particle size distributions. These products are produced to correspond to various filtration rates with in general the coarser the distribution the higher the flow through the material.

Particle size distributions of the various DE grades have indicated that the particles are generally finer than 50 microns even for the higher filtration rate grades.

Filtration of various solutions, for example beer, wine, glucose syrup etc, results in a relative clarity of filtrate dependent on the grade of DE used. The coarser the grade the poorer the clarity.

DISCLOSURE OF INVENTION

Rice hull ash if used in its "raw" form is not suitable as a filter aid because of the extremely coarse size and slight grinding is required. During grinding, however, a disproportionate quantity of ultrafine particles is produced. If filtration is attempted using this ground ash, blinding of filter cloths result because of the excessive quantity of fines and their angular shape.

The ultrafine particles must be removed from the rest of the ash and leave a product with a broad particle size distribution. Such removal can be achieved best by air classification. Although commonly used to remove coarse particles and retain the fines as product, the application involved here is the reverse, the coarse fraction is the product.

The specific particle size distribution sought depends on what approximate grade of product (i.e. what filtration rate) is required. The actual particle sizes, however, are much coarser than for DE.

For example one of the DE's "Speedex" has a particle size analysis that shows approximately $88\% < 40\mu$ compared to $20\% < 40\mu$ for one rice hull ash grade. Understandably, measured filtration rates in laboratory tests showed a much higher flow rate for rice hull ash than DE but also showed that the clarity of the filtrate was better for rice hull ash also. This apparently goes against the trend suggested previously regarding coarseness and filtrate clarity and can be explained by looking at the relative porosity of each material. The surface area of the DE is $\sim 800$ m$^2$/kg compared to a surface area for rice hull ash of 3600 m$^2$/kg. Thus rice hull ash is much more porous than even the finest grade of DE, with a surface area of 3000 m$^2$/kg.

The benefit of the higher surface area is that a higher flow can be obtained for a given clarity of filtrate.

For systems in which clarity of filtrate is the controlling factor, rice hull ash can improve the filtration rate and for systems where the rate is fixed, filtrate clarity may be improved.

A further benefit of rice hull ash, is that being generated from rice hulls which in turn is produced from rice paddy it is derived from a renewable resource, an agricultural product which does not require separate mining operations as does DE.

Environmentally the process to convert the rice hulls to a usable filter and is much cleaner than mining DE and processing it, and economically it is substantially cheaper.

Another substantial benefit of rice hull ash is the occupational health benefit of having only about 2% of the particles in the respirable range 5–6$\mu$ compared to up to for some DE's. Dust inhalation of these ultrafine particles can cause health problems. This problem is much reduced in using rice hull ash with a much lower level of respirable range product.

Production of filter aids from rice hull ash can be effected in several stages, these include:

1. Combustion of rice hulls

This can be performed in any unit in which the hulls are mixed with air to burn off organic matter. Several such units are available with a variety of principles of operation. The carbon content must be reduced to levels around 5% or lower to attain the high porosity required for filter aid production. Either one or two stage combustion may be used. High carbon content rice hull ash filter aids are also potentially produced by this process. Grinding of rice hulls prior to combustion may also form part of this process.

2. Grinding of rice hull ash

This can either be performed as a second or third stage or indeed be performed at the same time as the combustion stage, such as in a fluid bed combustor, with a sand bed. The sand bed and the high turbulence both within and above the bed cause the grinding required. Care must be taken not to grind too heavily or in the case of the fluid bed to fluidise too much as excessive grinding will produce too high a proportion of ultrafine and also produce too fine a total distribution. Excessive grinding will also destroy the porous structure attained in the combustion stage. Bulk density gives a good initial indication on the percentage of fine particles and should be no greater than about 400 kg/m$^3$.

3. Classification of rice hull ash

This is required irrespective of how the grinding process is performed and is the crucial stage in developing the various grades of the ash. The classification is best performed by air entraining the ash and passing it through a spinning rotor in a unit called an air classifier or separator. Several such units are available commercially but are generally not used in an application where the coarse material is the product and fine material is considered the tails. The main principle of operation is that, as the rotor speed is increased particles find it more difficult to pass through the vanes of the rotor until the point where the centrifugal force produced by the rotor is greater than the centripetal force of the air stream for a particle and it is flung to the outside of the classifier chamber and collected with the coarse fraction.

Variation of the rotor speed will allow a change in the cut point, the particle size with a 50% chance of reporting in the coarse and fine fractions, and hence a change in the properties of the rice hull ash as a filter aid.

Several other factors have effects on both the cut point and the efficiency of separation within the air classifier, all of which have been optimised to produce the best product.

Preferred Method

Rice hulls are burnt in a fluid bed combustor at a bed temperature of 900° C. The fluidising air velocity is such that it produced a reasonably well ground ash product without significant contamination from the sand bed and a bulk density of approximately 380 kg/m$^3$. This velocity is dependent upon the actual diameter of the combustor and depth of the sand bed.

The ash product having already been ground during combustion is then air classified to produce a product with typically a 20$\mu$ cut point resulting in a typical particle size distribution as shown below.

| Size Range ($\mu$) | % w/w |
| --- | --- |
| 180–300 | 5.9 |
| 125–180 | 16.7 |
| 90–125 | 20.9 |
| 45–90 | 41.8 |
| 35–45 | 5.0 |
| 28–35 | 3.9 |
| 21–28 | 3.1 |
| 14–21 | 1.5 |
| 7–14 | 0.6 |
| 3.5–7 | 0.3 |
| <3.5 | 0.3 |

Again the conditions under which the 20$\mu$ cut point are produced are dependent upon the particular make and size of the air classifier.

The cut point can be varied to achieve faster or slower filtering products with better or poorer filtrate clarities resulting.

MODES OF CARRYING OUT THE INVENTION

To summarise, the invention in its broadest form comprises a method of producing rice-hull-ash filter aid material comprising the steps of burning the rice hull to produce ash, grinding the ash to reduce its particle size, air classifying the ground ash to remove specific particles, possible further classifying the removed ash to remove any oversized particles and collecting the remaining particles.

The invention also comprises apparatus for producing rice-hull-ash filter aid material comprising a fluid bed combustor connected to an air classifier which may be connected to another classifier which is connected to a bin from which ash particles are collected.

Rice-hull-ash filter aid when made by the method and apparatus of the invention is also part of the inventive concept.

A preferred method of operation will now be described with reference to the drawing, FIG. 1.

Rice hulls are fed into the fluid bed combustor 1 ideally by mechanically controlled means (a). Air (b) is passed through the sand bed (c) as a fluidising media and combustion air (d) is added to complete the combustion in the freeboard area (e) prior to passing through the exit flue (f) on the way to the cyclone 2.

Ash is separated from the hot air stream and is discharged (g) while the hot air passes to a plant utilising the existing heat (h).

The ash is stored temporarily in a storage bin 3 until it is classified.

Primary air enters the air classifier 4 through suction pipe (i) and entrains the ash via pipe (j) after discharge from the storage bin to enter the classifier at point (k).

Centrifugal force imparted by the spinning rotor (l) classifies the ash with the coarse particles being contacted by a further air supply (m), to disperse any agglomerates of fine particles, and then dropping to the coarse product exit (n).

The fine ash particles exit through the pipe (0) of the classifier and are collected at the filter (5).

The classifying air passes through to a control valve 6 and fan 7 which provides the air flow.

EXAMPLE 1–LABORATORY SCALE TEST

Rice hull ash produced in a fluid bed combustor as described above and classified to produce a product with a 20$\mu$ cut and a particle size distribution similar to that given previously, was used in a filtration trial using a liquor with an initial turbidity of 0.210 absorption units.

The filtration rate achieved with the rice hull ash relative to the rate for normal DE was 1.40 (assuming normal DE at 1.00) and the turbidity of the filtrate was 0.009 absorption units. This represented a 96% reduction in turbidity.

A comparative test using Speedex DE with a filtration rate of 1.00 resulted in a decrease in turbidity of 92% to 0.015 absorption units.

EXAMPLE 2–PILOT SCALE TEST

Using ash produced as above and classified on a slightly larger scale, a pilot filtration test was conducted.

A relative filtration rate of 1.00 was averaged over three trials with a maximum rate recorded at 1.27 and filtrate clarity of 0.44 absorbance units which was well within specification for that particular liquid.

As can be seen from the foregoing the filtration characteristics of the invention give comparable or superior performance to known filter aids.

What I claim is:

1. A method of producing and using filter aid material comprising the steps of:

burning rice hulls to produce ash;
grinding said ash to produce reduced size particles;

air classifying said reduced size particles to remove particles smaller than a preselected size;
collecting the remaining particles; and
using the remaining particles as a filter aid material.

2. The method of claim 1, wherein said burning produces hot combustion air, and including the further step of separating said ground ash from said hot combustion air prior to said air classifying step.

3. The method of claim 1, including the further step of grinding said rice hulls prior to said burning step.

* * * * *